(No Model.) 2 Sheets—Sheet 1.

T. J. RUSSELL.
COMBINED SEED PLANTER, HARROW, AND PLOW.

No. 417,513. Patented Dec. 17, 1889.

Witnesses  
E. D. Smith  
Alfred T. Gage

Inventor  
Thomas J. Russell,  
by W. D. Henderson,  
his Attorney.

(No Model.) 2 Sheets—Sheet 2.
T. J. RUSSELL.
COMBINED SEED PLANTER, HARROW, AND PLOW.
No. 417,513. Patented Dec. 17, 1889.
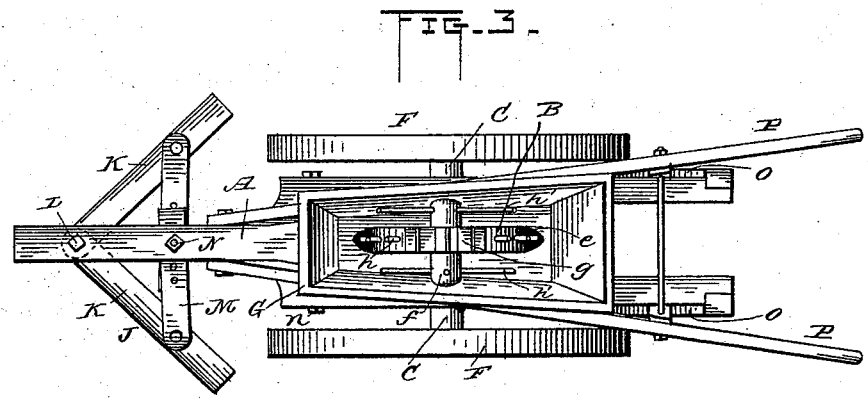
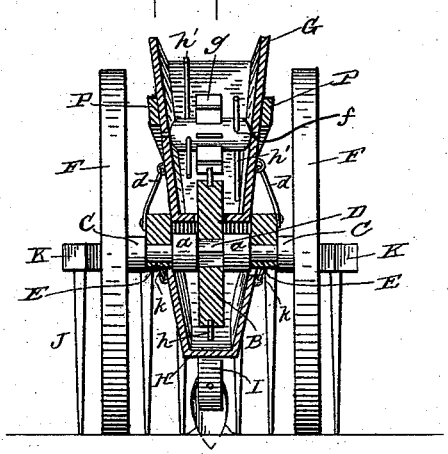
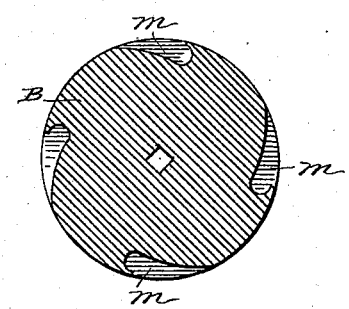

UNITED STATES PATENT OFFICE.

THOMAS J. RUSSELL, OF MINEOLA, TEXAS.

COMBINED SEED-PLANTER, HARROW, AND PLOW.

SPECIFICATION forming part of Letters Patent No. 417,513, dated December 17, 1889.

Application filed February 23, 1889. Serial No. 300,916. (No model.)

*To all whom it may concern:*

Be it known that I, THOMAS J. RUSSELL, a citizen of the United States, residing at Mineola, in the county of Wood and State of Texas, have invented certain new and useful Improvements in Combined Seed-Planter, Harrow, and Plow; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to agricultural implements, and has for its object to provide a combined seeder or planter, harrow, and plow, and to simplify the parts, so that they can easily be put together and taken apart and manufactured at little expense.

To the accomplishment of the above and such other objects as may hereinafter appear the invention consists in the construction and the combination of parts hereinafter particularly described and then claimed, reference being had to the accompanying drawings, forming a part hereof.

Figure 1:
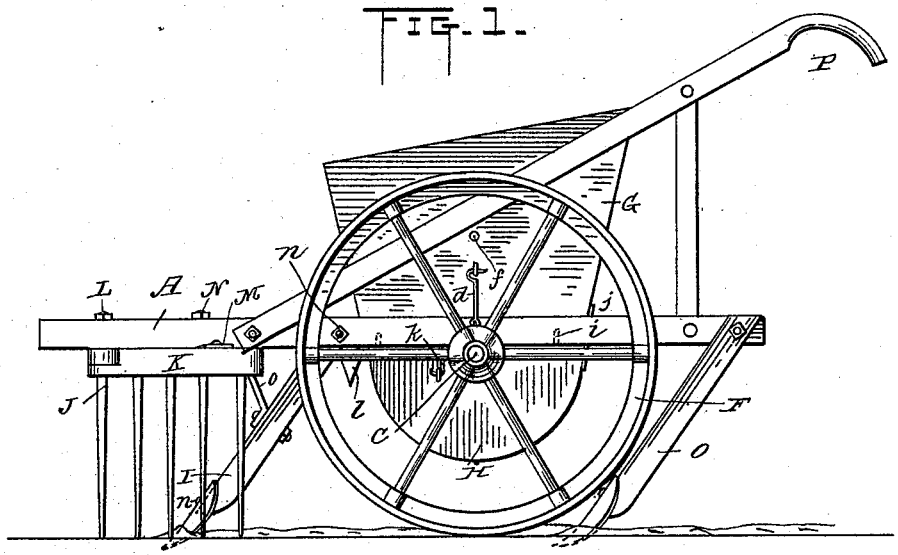
Figure 2:
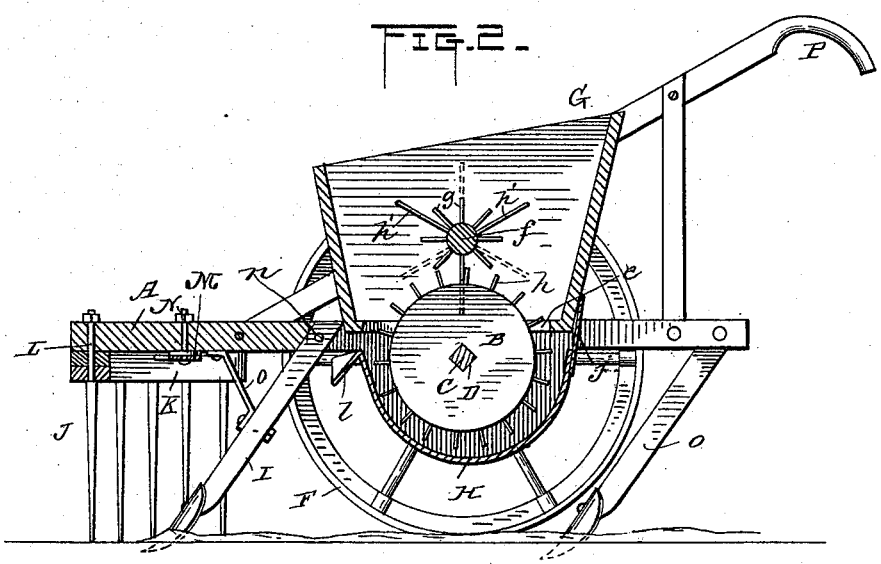

Figure 1 is a side elevation. Fig. 2 is a vertical longitudinal section. Fig. 3 is a plan view; Fig. 4, a rear elevation with parts in section. Fig. 5 is a sectional detail of the feed-wheel.

In the drawings, the letter A designates the frame divided back of the tongue, so as to receive the feed-wheel B, which is secured to the axle C by forming an angular shoulder D on the axle and a correspondingly-shaped opening in the feed-wheel, which will cause it to turn with the shaft or axle. The axle is journaled in boxes E, secured by bolts to the under side of the frame, so that the axle and its wheels F may be readily removed when desired. The axle is preferably formed with collars or shoulders $a$, so as to restrict its lateral movement.

The seed-box G rests on top of the frame and is secured thereto by the hooks $d$. A slot $e$ is formed in its bottom, so that the feed-wheel may project up into the box, and a shaft $f$, journaled in the sides of the box, is provided with blades $g$, against which pins $h$, projecting from the feed-wheel, strike, so as to turn the same and agitate the contents of the box. The shaft is also provided with arms $h'$ to one side of the blades, so as to stir the material not reached by the blades. Beneath the frame there is supported the trough H, the same being provided with pins $i$ to enter the frame and with a lip $j$, extending up through the open portion of the frame and bearing against the rear of the seed-box, thus forming a close joint against the frame and preventing the escape of any material, except at the point desired. The trough is further secured to the frame by hooks $k$, and at its forward end is formed with the spout $l$ for the delivery of the material. As the drive-wheels turn the feed-wheel carried by the axle is revolved, so that the pins in the wheel will carry the material in the box into the spout $l$, from which it drops to the ground. Any material that may be carried past the spout is caught in the trough fitting around the feed-wheel and thus prevented from wasting.

Instead of using the feed-wheel with the pins in it, I may replace it with a wheel having cavities $m$ formed in its periphery, which cavities will catch the material and carry it to the point of discharge, and by closing any one or more of these cavities the distance apart of the drop may be regulated.

In order to open the ground to receive the seed, I secure a foot I to the frame in front of the box, which will be provided with a blade or point suitable for the purpose. This foot is secured by a bolt $n$, so as to be removable, and is braced by a rod $o$.

With the view of clearing the ground of rubbish and clods, so as to better prepare it to receive the seed, I secure a harrow J to the under side of the forward part of the frame. This harrow is composed of two bars K, joined together at their forward ends and pivoted to the frame by a bolt L, and between their forward and rear ends are provided with lateral perforated plates or bars M, which lap each other and are joined together by a bolt N, passing through the perforations and entering the frame. By removing the bolt and adjusting the side bars and passing the bolt through other perforations the distance apart of the side bars and width of the harrow may be regulated.

To the rear of the seed-box two standards O extend down from the frame and are for the attachment of suitable covering-plows.

The handles are represented by the letter P.

All the parts described may be used together, or, if desired, the seed-box, axle, and drive-wheels may be removed and only the harrow, foot, and plow be used together; so, also, the foot may be removed and only the harrow and plow used; or the foot and plow may be removed and only the harrow used; or the harrow may be removed and only the double plows used. In all cases the one frame serves for all the uses. It will thus be seen that the implement is readily converted from one form to the other; also, that the parts are readily attached and detached. It is also evident that corn, cotton, or other seed may be planted by the machine, and also that it may be used as a fertilizer-distributer.

The operation of the several parts is plain from the description of their construction.

Having described my invention and set forth its merits, what I claim is—

1. The combination, with the frame divided at its rear part and provided with a feed-wheel carried in the open part by the axle, of the seed-box secured to the frame by the hooks and the detachable trough H, suspended beneath the frame by hooks and provided with the pins $i$, entering the frame, the lip $j$, extending up through the open portion of the frame and bearing against the rear of the seed-box, and the spout $l$, for the delivery of the material, substantially as and for the purposes set forth.

2. The combination, with the wheels and detachable seed-box and trough, of the frame A, having the forwardly-extending portion for the pivoting of the harrow J by the bolt L and its bracing by the adjusting-arms K and the two rearward portions extending along the sides of said box and trough for the support of said parts and to the rear thereof for the attachment of the plows O, said frame thus forming the support for all of said parts, and its rearwardly-extending portions constituting an open frame from the point of divergence from the forwardly-extending portion to the rear of said backwardly-extending portions, substantially as and for the purposes set forth.

In testimony whereof I affix my signature in presence of two witnesses.

THOMAS J. RUSSELL.

Witnesses:
C. C. GOLDSMITH,
G. C. ENNIS.